US012390846B2

United States Patent
Fujita et al.

(10) Patent No.: US 12,390,846 B2
(45) Date of Patent: Aug. 19, 2025

(54) METHOD OF DETECTING CHATTERING IN COLD ROLLING MILL, CHATTERING DETECTING DEVICE FOR COLD ROLLING MILL, COLD ROLLING METHOD, COLD ROLLING MILL, AND METHOD OF MANUFACTURING STEEL SHEET

(71) Applicant: JFE Steel Corporation, Tokyo (JP)

(72) Inventors: Noriki Fujita, Tokyo (JP); Takuya Kitamura, Tokyo (JP); Tetsuya Arakawa, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 273 days.

(21) Appl. No.: 18/276,095

(22) PCT Filed: Oct. 29, 2021

(86) PCT No.: PCT/JP2021/040060
§ 371 (c)(1),
(2) Date: Aug. 7, 2023

(87) PCT Pub. No.: WO2022/172525
PCT Pub. Date: Aug. 18, 2022

(65) Prior Publication Data
US 2024/0033797 A1 Feb. 1, 2024

(30) Foreign Application Priority Data
Feb. 15, 2021 (JP) .................... 2021-021844

(51) Int. Cl.
B21B 37/00 (2006.01)
B21B 1/28 (2006.01)
B21B 38/00 (2006.01)

(52) U.S. Cl.
CPC .......... B21B 37/007 (2013.01); B21B 38/008 (2013.01); B21B 1/28 (2013.01)

(58) Field of Classification Search
CPC .......... B21B 38/008; B21B 37/58; B21B 1/28
See application file for complete search history.

(56) References Cited

U.S. PATENT DOCUMENTS 7,823,428 B1 * 11/2010 Malik .................. B21B 37/28
72/8.9
2022/0072594 A1 3/2022 Nagai et al.

FOREIGN PATENT DOCUMENTS

CN 103521531 A 1/2014
CN 105522000 A * 4/2016
(Continued)

OTHER PUBLICATIONS

Translation of CN-105522000.*
(Continued)

Primary Examiner — Bobby Yeonjin Kim
(74) Attorney, Agent, or Firm — Buchanan Ingersoll & Rooney PC

(57) ABSTRACT

A method of detecting chattering in a cold rolling mill, the method includes: a step of predicting occurrence of chattering during rolling of a material to be rolled, by inputting second multidimensional data to a prediction model, the second multidimensional data having been generated based on condition data corresponding to array data related to the material to be rolled, and the prediction model having been trained with an explanatory variable and an objective variable, the explanatory variable being first multidimensional data generated based on one-dimensional array data representing a past rolling record of rolling of rolled materials by means of a cold rolling mill, and the objective variable being a past record of occurrence of chattering corresponding to the past rolling record.

14 Claims, 7 Drawing Sheets

(56) References Cited

FOREIGN PATENT DOCUMENTS

| | | | | | |
|---|---|---|---|---|---|
| CN | 111922095 | A | | 11/2020 | |
| EP | 0460892 | A2 | | 12/1991 | |
| JP | 2000-158044 | A | | 6/2000 | |
| JP | 2005297025 | A | | 10/2005 | |
| JP | 2009175937 | A | | 8/2009 | |
| JP | 2013111614 | A | | 6/2013 | |
| JP | 2016153138 | A | | 8/2016 | |
| JP | 6702405 | B1 | * | 6/2020 | ............ B21C 51/00 |
| JP | 2020104133 | A | | 7/2020 | |
| KR | 101091285 | B1 | | 12/2011 | |
| TW | 202024594 | A | * | 7/2020 | ............ B21C 51/00 |

OTHER PUBLICATIONS

Translation of JP-6702405.*
Translation of TW-202024594.*
The Extended European Search Report for European Application No. 21925770.6, dated Mar. 15, 2024, 7 pages.
International Search Report and Written Opinion for International Application No. PCT/JP2021/040060, dated Nov. 22, 2021, 5 pages.
Taiwanese Search Report for Taiwanese Application No. 110143056, dated Jun. 21, 2022, with partial translation, 10 pages.
Office Action (The First Office Action) issued May 31, 2025, by the State Intellectual Property Office of People's Republic of China in corresponding Chinese Patent Application No. 202180093183.4 and an English translation of the Office Action. (19 pages).

* cited by examiner

METHOD OF DETECTING CHATTERING IN COLD ROLLING MILL, CHATTERING DETECTING DEVICE FOR COLD ROLLING MILL, COLD ROLLING METHOD, COLD ROLLING MILL, AND METHOD OF MANUFACTURING STEEL SHEET

CROSS REFERENCE TO RELATED APPLICATIONS

This is the U.S. National Phase application of PCT/JP2021/040060, filed Oct. 29, 2021, which claims priority to Japanese Patent Application No. 2021-021844, filed Feb. 15, 2021, the disclosures of each of these applications being incorporated herein by reference in their entireties for all purposes.

FIELD OF THE INVENTION

The present invention relates to: a method of detecting chattering in a cold rolling mill; a chattering detecting device for a cold rolling mill; a cold rolling method; a cold rolling mill; and a method of manufacturing a steel sheet.

BACKGROUND OF THE INVENTION

In recent years, there has been a growing need for thin hard materials having thin gauges while having high strength for purposes including reduction of fuel consumption by weight reduction. However, mill vibration called chattering occurs at a frequency of about 30 to 200 Hz in high-load cold rolling of such a material difficult to be rolled and thickness of the material rolled tends to change periodically, the mill vibration being in a vertical direction or a horizontal direction and mainly being caused by lack of lubrication. This chattering thus is a factor impeding increase in production of high value-added products. Accordingly, in a method proposed in Patent Literature 1, trouble caused by chattering is prevented by detecting vibration sign for chattering, on the basis of the temporal waveform of vibration intensity of a cold rolling mill, and decreasing the rolling speed when the vibration sign has been detected.

PATENT LITERATURE

Patent Literature 1: Japanese Unexamined Patent Application Publication No. 2020-104133

SUMMARY OF THE INVENTION

However, although the method described in Patent Literature 1 enables prevention of chattering to some extent, there may be a delay in prediction of occurrence of chattering due to, for example, rapid occurrence of chattering in a state where no vibration sign has been detected. Setting a low vibration intensity threshold may be considered for solving such a problem, the low vibration intensity threshold being for determination of whether vibration is vibration sign. However, if the threshold is set low, vibration sign will be detected frequently and the rolling velocity will be decreased, and productivity will thus be impeded.

The present invention has been made in view of the above described problems, and an object thereof is to provide a method of detecting chattering in a cold rolling mill and a chattering detecting device that enable accurate prediction of occurrence of chattering. Furthermore, another object of the present invention is to provide a cold rolling method and a cold rolling mill that enable: prevention of chattering; and productive cold rolling. In addition, yet another object of the present invention is to provide a method of manufacturing a steel sheet, the method enabling high-yield manufacture of a steel sheet having desired product characteristics and mechanical properties.

To solve the problem and achieve the object, a method of detecting chattering in a cold rolling mill, according to embodiments of the present invention, includes: a step of predicting occurrence of chattering during rolling of a material to be rolled, by inputting second multidimensional data to a prediction model, the second multidimensional data having been generated based on condition data corresponding to array data related to the material to be rolled, and the prediction model having been trained with an explanatory variable and an objective variable, the explanatory variable being first multidimensional data generated based on one-dimensional array data representing a past rolling record of rolling of rolled materials by means of a cold rolling mill, and the objective variable being a past record of occurrence of chattering corresponding to the past rolling record.

Moreover, in the method of detecting chattering in the cold rolling mill according to embodiments of the present invention, the condition data are one-dimensional array data representing rolling conditions for the material to be rolled, or temporal change of an operation state of the cold rolling mill in rolling of the material to be rolled, and the first multidimensional data and the second multidimensional data are data resulting from connection of the condition data or the data resulting from shifting of the condition data in a time direction, in a first direction and/or a second direction.

Moreover, in the method of detecting chattering in the cold rolling mill according to embodiments of the present invention, a time pitch in a case where the condition data are shifted in the time direction is equal to or less than one second (but not including 0 seconds).

Moreover, in the method of detecting chattering in the cold rolling mill according to embodiments of the present invention the condition data are one-dimensional array data representing signal intensity in FFT, and the first multidimensional data and the second multidimensional data are data resulting from connection of the condition data or the condition data collected at time intervals, in a first direction and/or a second direction.

Moreover, the method of detecting chattering in the cold rolling mill according to an embodiment of the present invention includes: a step of decreasing rolling speed of the material to be rolled by the cold rolling mill in a case where chattering has been predicted to occur.

Moreover, in the method of detecting chattering in the cold rolling mill according to an embodiment of the present invention, the cold rolling mill is a cold tandem rolling mill including plural rolling stands and includes a first rolling oil supply system that supplies first emulsion rolling oil to each of the rolling stands and a second rolling oil supply system that supplies second emulsion rolling oil having a concentration different from that of the first emulsion rolling oil to some of the rolling stands, and the method includes a step of changing amount of supply of the second emulsion rolling oil from the second rolling oil supply system in a case where chattering has been predicted to occur.

Moreover, a chattering detecting device for a cold rolling mill, according to embodiments of the present invention, includes: a means of predicting occurrence of chattering during rolling of a material to be rolled, by inputting second multidimensional data to a prediction model, the second multidimensional data having been generated based on condition data corresponding to array data related to the material to be rolled, and the prediction model having been trained with an explanatory variable and an objective variable, the explanatory variable being first multidimensional data generated based on one-dimensional array data representing a past rolling record of rolling of rolled materials by a cold rolling mill, and the objective variable being a past record of occurrence of chattering corresponding to the past rolling record.

Moreover, a cold rolling method according to embodiments of the present invention includes: a step of rolling a rolled material by using the method of detecting chattering in the cold rolling mill according to embodiments of the present invention.

Moreover, a cold rolling mill according to embodiments of the present invention includes: the chattering detecting device for the cold rolling mill according to embodiments of the present invention.

Moreover, a method of manufacturing a steel sheet according to embodiments of the present invention includes: a cold rolling process of cold rolling a rolled material by using the cold rolling method according to embodiments of the present invention; and an annealing process of performing annealing for the rolled material that has been cold rolled in the cold rolling process, at a soaking temperature of 600 to 950° C. and in-furnace tension of 0.1 to 3.0 kgf/mm$^2$.

A method of detecting chattering in a cold rolling mill and a chattering detecting device, according to embodiments of the present invention, enable accurate prediction of occurrence of chattering. Furthermore, a cold rolling method and a cold rolling mill, according to embodiments of the present invention, enable: prevention of chattering; and productive cold rolling. In addition, a method of manufacturing a steel sheet, according to embodiments of the present invention, enables high-yield manufacture of a steel sheet having desired product characteristics and mechanical properties.

DETAILED DESCRIPTION OF EMBODIMENTS OF THE INVENTION

A method of detecting chattering in a cold rolling mill, a chattering detecting device for a cold rolling mill, a cold rolling method, a cold rolling mill, and a method of manufacturing a steel sheet that are each an embodiment of the present invention will be described hereinafter by reference to the drawings. The embodiments described hereinafter exemplify devices and methods for embodying technical ideas of the present invention, and materials, shapes, structures, and arrangements, for example, of components are not to be limited to the embodiments described hereinafter. Furthermore, the drawings are schematic drawings. Therefore, it is to be noted that relations or ratios, for example, between thicknesses and dimensions of planes are different from the actual ones, and a portion having dimensional relations or ratios that also differ between drawings is included.

Configuration of Cold Rolling Mill

Figure 1:
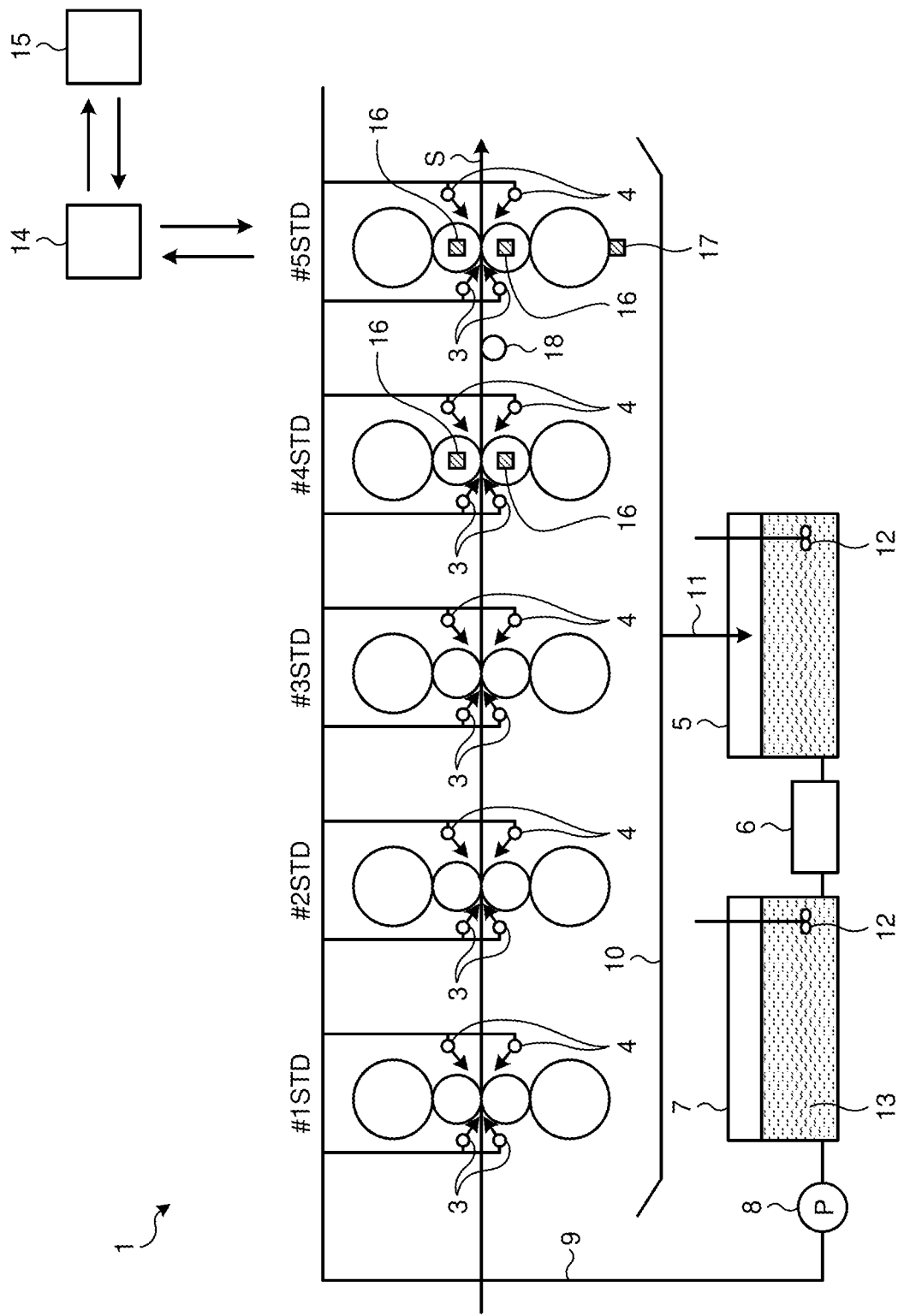
FIG. 1 is a diagram illustrating a configuration of a cold rolling mill that is an embodiment of the present invention.

First of all, a configuration of a cold rolling mill that is an embodiment of the present invention will be described by reference to FIG. 1. FIG. 1 is a diagram illustrating the configuration of the cold rolling mill according to the embodiment of the present invention. In this specification, "cold rolling" may simply be referred to as "rolling", and according to this specification, "cold rolling" and "rolling" are synonymous with each other. Furthermore, a steel sheet is described hereinafter as an example of a rolled material (a material to be rolled) that is rolled by the cold rolling mill. However, without being limited to a steel sheet, any other metal strip, such as an aluminum sheet, is also applicable as the rolled material.

As illustrated in FIG. 1, a cold rolling mill 1 that is an embodiment of the present invention is a cold tandem rolling mill including five rolling stands that are a first rolling stand to a fifth rolling stand (#1STD to #5STD) in order from near an entrance for a steel sheet S (leftward in FIG. 1) to near an exit for the steel sheet S (rightward in FIG. 1). Tension rolls and deflector rolls, thickness meters, and shape measuring instruments that are not illustrated in the drawings are installed as appropriate between adjacent ones of the rolling stands in this cold rolling mill 1. Furthermore, the configuration of the rolling stands and the conveyance device for the steel sheet S, for example, are not particularly limited, and publicly known techniques may be used as appropriate.

Each of the rolling stands in the cold rolling mill 1 is configured to be supplied with emulsion rolling oil (which may simply be referred to as "rolling oil" in the description hereinafter) 13. The cold rolling mill 1 includes, as rolling oil storage tanks, a dirty tank (a recovery tank) 5 and a clean tank 7, and rolling oil supplied from these rolling oil storage tanks is supplied to the rolling stands through a supply line 9.

Rolling oil recovered by an oil pan 10 arranged below the rolling stands, that is, rolling oil that has been used in cold rolling flows into the dirty tank 5 through return piping 11. Rolling oil stored in the clean tank 7 is rolling oil formed by mixture of warm water (dilution water) and undiluted rolling oil (with a surfactant added therein). The warm water and the undiluted rolling oil that have been mixed together are made into the rolling oil having aimed desired mean particle size and concentration range by adjustment of the rotation speed of a rotation blade of a stirrer 12, that is, by adjustment of the degree of stirring.

Any undiluted rolling oil used in normal cold rolling is able to be used, and for example, undiluted rolling oil including base oil that is any of, for example, natural oils, fatty acid esters, and hydrocarbon-based synthetic lubricants may be used as the undiluted rolling oil. Furthermore, additives used in normal cold rolling oil, such as an oiliness improver, an extreme pressure additive, and an antioxidant, may be added to any of these kinds of rolling oil. In addition, any of ionic and non-ionic surfactants may be used as the surfactant added to the rolling oil and any surfactant used in normal circulation coolant systems (circulation rolling oil supply systems) may be used. The undiluted rolling oil is preferably diluted to a concentration of 2 to 8 mass % and more preferably to a concentration of 3 to 6.0 mass % to be made into an O/W emulsion rolling oil having oil dispersed in water by use of the surfactant. The rolling oil preferably has a mean particle size of 15 μm or smaller and more preferably 3 to 10 μm.

After operation is started, the rolling oil recovered in the dirty tank 5 flows into the clean tank 7 via an iron powder removal device 6 including an iron powder quantity control device. The rolling oil recovered in the dirty tank 5 contains abrasion powder (iron powder) generated by friction between the rolling rolls and the steel sheet S. The iron powder removal device 6 thus removes the abrasion powder so that the dissolved iron content in the recovered rolling oil becomes an allowable dissolved iron content for the rolling oil stored in the clean tank 7. Movement of the emulsion rolling oil from the dirty tank 5 to the clean tank 7 via the iron powder removal device 6 may be performed continuously or intermittently. The iron powder removal device 6 is preferably an device that removes the iron powder by adhesion using a magnet filter, such as an electromagnetic filter or a magnet separator, but is not limited to such an device. The iron powder removal device 6 may be a publicly known device using centrifugal separation or another method.

Part of the rolling oil supplied to the cold rolling mill 1 is taken out from the system by the steel sheet S and/or is lost by evaporation. Therefore, the clean tank 7 is configured to be refilled (supplied) with undiluted rolling oil from an undiluted rolling oil tank (not illustrated in the drawings) as appropriate such that the storage level and concentration of the rolling oil in the clean tank 7 are maintained in predetermined ranges. Furthermore, the clean tank 7 is also refilled (supplied) with warm water for dilution, as appropriate. The storage level and concentration of the emulsion rolling oil in the clean tank 7 are able to be measured by sensors not illustrated in the drawings.

A rolling oil supply system of the cold rolling mill 1 will be described in detail next. The rolling oil supply system includes the dirty tank 5, the iron powder removal device 6, the clean tank 7, and a pump 8 that pumps up the rolling oil from the clean tank 7. Furthermore, a strainer for removing foreign matter may be arranged between the clean tank 7 and the pump 8.

The rolling oil supply system includes: the supply line 9 having one end portion connected to the clean tank 7; and five lubrication coolant headers 3 and five cooling coolant headers 4 that are branched from the other end portion (near the rolling mill) of the supply line 9 and are respectively arranged at positions corresponding to the rolling stands.

The lubrication coolant headers 3 are arranged near entrances of the rolling stands and spray rolling oil serving as a lubricant to the roll bites from spray nozzles respectively provided therein to thereby supply the lubricant to the roll bites and the work rolls. The cooling coolant headers 4 are arranged near exits of the rolling stands and spray rolling oil to the rolling rolls from spray nozzles respectively provided therein to thereby cool the rolling rolls.

This configuration allows the emulsion rolling oil in the clean tank 7 to be: pressure-fed to the supply line 9 by the pump 8; supplied to the lubrication coolant headers 3 and cooling coolant headers 4 respectively arranged at the rolling stands; and supplied to the sprayed portions from the spray nozzles respectively provided therein. Furthermore, the emulsion rolling oil supplied to the rolling rolls is: recovered by the oil pan 10 except for the part taken outside the system by the steel sheet S and lost by evaporation; and returned into the dirty tank 5 through the return piping 11. Thereafter, part of the emulsion rolling oil stored in the dirty tank 5 is returned into the clean tank 7 after removal of some dissolved iron by the iron powder removal device 6 for removal of a certain amount of dissolved iron in the emulsion rolling oil, the dissolved iron having been generated by cold rolling.

This rolling oil supply system supplies the rolling oil that has been subjected to the abrasion powder removal process, to the rolling rolls by circulation. That is, the supplied emulsion rolling oil is recycled. The clean tank 7 herein corresponds to a rolling oil tank for circulation in a conventional circulatory oil feeding system, and as described above, the clean tank 7 is refilled (supplied) with undiluted rolling oil as appropriate.

Method of Detecting Chattering

Figure 2:
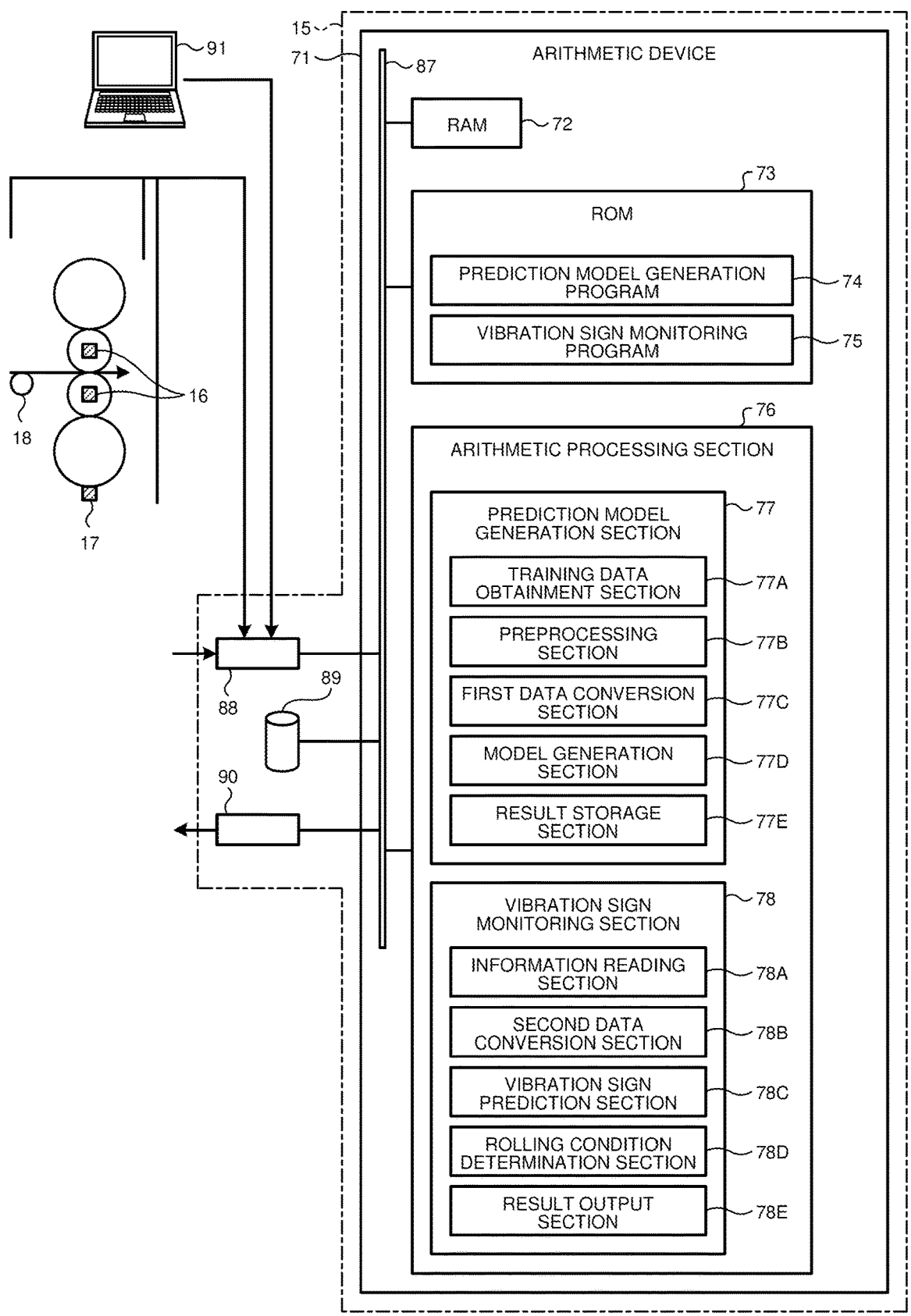
FIG. 2 is a block diagram illustrating a configuration of an arithmetic unit that is an embodiment of the present invention.

A method of detecting chattering in a cold rolling mill and a chattering prediction model will be described in detail next, the method being an embodiment of the present invention. FIG. 2 is a block diagram illustrating a configuration of an arithmetic unit that is an embodiment of the present invention.

Functions related to the chattering prediction model in this embodiment are implemented by an arithmetic unit 15, a vibration measurement device 16, a load cell 17, and a tensiometer 18 that are illustrated in FIG. 2. A rolling control device 14 (see FIG. 1) controls, on the basis of a control signal from the arithmetic unit 15, rolling conditions for the cold rolling mill 1.

The arithmetic unit 15 includes an arithmetic device 71, an input device 88, a storage device 89, and an output device 90. The arithmetic device 71 is connected by wire to the input device 88, the storage device 89, and the output device 90, via a bus 87. The arithmetic device 71, the input device 88, the storage device 89, and the output device 90 are not necessarily connected in this way, and they may be connected wirelessly or connected by a combination of wired connection and wireless connection.

The input device 88 functions as an input port to which information is input, the information including: control information from the rolling control device 14 (see FIG. 1); temporal change in the vibration waveform at the cold rolling mill 1 measured by the vibration measurement device 16; temporal change in rolling load information on the cold rolling mill 1 obtained by the load cell 17; temporal change in tension between rolling stands measured by the tensiometer 18; and information from an operation monitoring device 91. The information from the operation monitoring device 91 includes execution command information for the chattering prediction model, information (steel type and size) related to the material to be rolled, and cold rolling conditions (numerical information, textual information, and image information) set by an operator before cold rolling.

The storage device 89 is a device that includes, for example, a hard disk drive, a semiconductor drive, or an optical drive, and stores information required in the system (information required for implementation of functions of a prediction model generation section 77 and a vibration sign monitoring section 78 that are described later).

The output device 90 functions as an output port that outputs a control signal from the arithmetic device 71, to the rolling control device 14.

The operation monitoring device 91 includes any display, such as a liquid crystal display or an organic display. The operation monitoring device 91 receives various pieces of information representing operation states of the cold rolling mill 1 from the rolling control device 14 and display these pieces of information on an operation screen for an operator to monitor the operation states.

The arithmetic device 71 includes a RAM 72, a ROM 73, and an arithmetic processing section 76. The ROM 73 stores a prediction model generation program 74 and a vibration sign monitoring program 75 that are computer programs. The arithmetic processing section 76 has an arithmetic processing function and is connected to the RAM 72 and the ROM 73, via the bus 87. The RAM 72, the ROM 73, and the arithmetic processing section 76 are connected to the input device 88, the storage device 89, and the output device via the bus 87.

The arithmetic processing section 76 includes, as functional blocks, the prediction model generation section 77 and the vibration sign monitoring section 78.

The prediction model generation section 77 is a processing section that generates the chattering prediction model using a machine learning technique for associating a past rolling record of rolling of steel sheets S by the cold rolling mill 1, with a past record of occurrence of chattering, the past record corresponding to the past rolling record. A neural network model is used in this embodiment as the chattering prediction model using the machine learning technique. The machine learning technique is not limited to the neural network and any other publicly known machine learning technique may be adopted.

The prediction model generation section 77 includes a training data obtainment section 77A, a preprocessing section 77B, a first data conversion section 77C, a model generation section 77D, and a result storage section 77E. By executing the prediction model generation program 74 stored in the ROM 73 in response to receipt of an instruction to generate the chattering prediction model from the operation monitoring device 91, the prediction model generation section 77 executes respective functions of the training data obtainment section 77A, the preprocessing section 77B, the first data conversion section 77C, the model generation section 77D, and the result storage section 77E. The chattering prediction model is updated every time the prediction model generation section 77 executes the prediction model generation program 74.

As a preliminary process for generating the chattering prediction model, the training data obtainment section 77A obtains plural sets of training data (for example, about 10,000 sets) having: input record data that are operation record data on rolling conditions and temporal waveform data; and output record data that correspond to the input record data and are a record of occurrence of chattering in hot rolling. The training data obtainment section 77A obtains the input record data and output record data from the storage device 89 to generate the training data. Each set of training data includes a pair of input record data and output record data. The training data obtainment section 77A stores the training data into the storage device 89. The training data obtainment section 77A may supply the training data to the preprocessing section 77B and the model generation section 77D without storing the training data into the storage device 89.

Figure 3:
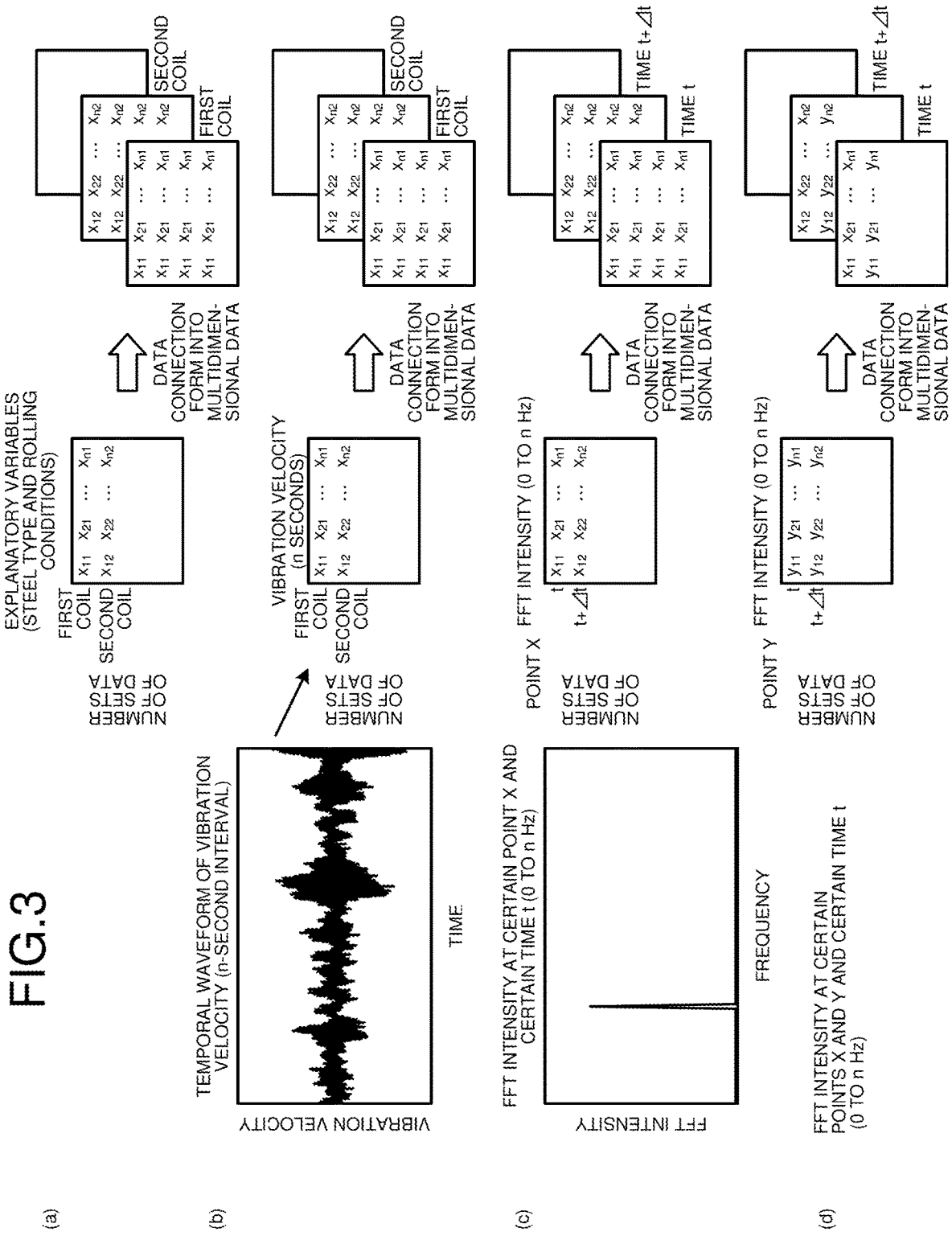
FIG. 3 is a diagram illustrating an example of multidimensional array information.

The input record data include multidimensional array information having explanatory variables connected in a time direction. Cases where information illustrated in FIG. 3(a) to FIG. 3(d) is adopted as the multidimensional array information will be described as examples for this embodiment. FIG. 3(a) illustrates an example of the input record data having coil conditions along columns (in a vertical direction) and explanatory variables along rows (in a horizontal direction), the explanatory variables being selected from the operation record data on rolling conditions. Information, such as base metal thicknesses of steel sheets S, thicknesses before and after cold rolling, sheet widths, deformation resistance of the steel sheets S, rolling loads in the cold rolling, front and rear tension, dimensions of work rolls, bender amounts of the work rolls, roughness of the work rolls, bender amounts of intermediate rolls, and shift amounts of the intermediate rolls, may be used as representative operation record data on rolling conditions, but the number of columns for the explanatory variables is not particularly limited. In this example, multidimensional array information connected per coil condition in the time direction (depth direction) is generated as training data. The time pitch for connection in the time direction is preferably 0 to 1 second inclusive. Furthermore, in a case where there are no time series data, or in a case where the explanatory variable does not change over time, the time pitch is 0 seconds and the same data are thus duplicated.

FIG. 3(b) illustrates an example having: coil conditions along columns (in a vertical direction); and input record data along rows (in a horizontal direction) and having, as an explanatory variable, time series data of operation record data for a certain time interval. Similarly to the example illustrated in FIG. 3(a), multidimensional array information connected per coil condition in a time direction (depth direction) is generated as training data. For this example, the time series data on vibration speed are illustrated, but without being particularly limited to this example, the time series data may be on the rolling loads, tension between stands, thickness deviation, vibration displacement, and vibration acceleration, for example.

FIG. 3(c) illustrates an example having time series along columns (in a vertical direction) and input record data along rows (in a horizontal direction), the input record data having, as an explanatory variable, signal intensity (FFT intensity) obtained upon fast Fourier transform (FFT) of a signal waveform at a certain time point. In this example, multidimensional array information resulting from duplication of a signal intensity at a certain time point t and a specific measurement position serves as training data, the duplication having been made in the time direction (depth direction) at a time pitch of 0 to 1 second.

FIG. 3(d) illustrates an example having time series along columns (in a vertical direction) and input record data along rows (in a horizontal direction), the input record data having, as an explanatory variable, signal intensity obtained upon FFT of a signal waveform at a certain spot and a certain time point. In this embodiment, if connection is performed in the time direction (depth direction), the signal intensity data do not need to be those on the same spot, and multidimensional array information resulting from connection of signal intensity data on plural spots may be generated as training data. Furthermore, in this example, signal intensity in a certain frequency range is illustrated but the range of frequency is not particularly limited.

In the examples illustrated in FIG. 3(a) to FIG. 3(d), the multidimensional array information is data (two-dimensional data) connected in a vertical direction, but data may be connected only in a depth direction or the multidimensional array information may be three dimensional data resulting from connection of data in both the vertical direction and the depth direction. Furthermore, in the examples illustrated in FIG. 3(a) to FIG. 3(d), the vertical direction corresponds to a first direction (or a second direction) according to embodiments of the present invention and the depth direction corresponds to a second direction (or a first direction) according embodiments of to the present invention.

Furthermore, in a case where no rolling record data (training data) have been stored in the storage device 89 (for example, in a case where there is no past record for the rolling conditions or the steel type conditions) or in a case where the number of samples is small, the training data obtainment section 77A requests an operator to execute cold rolling once or a plural number of times without using the chattering prediction model. In addition, because the larger the number of sets of training data stored in the storage device 89, the higher the prediction accuracy of the chattering prediction model, in a case where the number of sets of training data is less than a preset threshold, the training data obtainment section 77A may request the operator to execute cold rolling without using the chattering prediction model until the number of sets of training data reaches the threshold.

Reference will now be made to FIG. 2 again. The preprocessing section 77B processes the training data obtained by the training data obtainment section 77A, for the chattering prediction model. Specifically, the preprocessing section 77B standardizes (normalizes) the range of input record data in the training data to a range of 0 to 1, to cause the neural network model to read the training data. The input record data are multidimensional information. Therefore, by using a convolutional neural network 300, the first data conversion section 77C dimensionally compresses the input record data into one-dimensional information (see FIG. 4) in a state where feature values have been kept. The input record data are connected to an input layer 101 (see FIG. 4) in a state of being the one-dimensional information.

Figure 5:
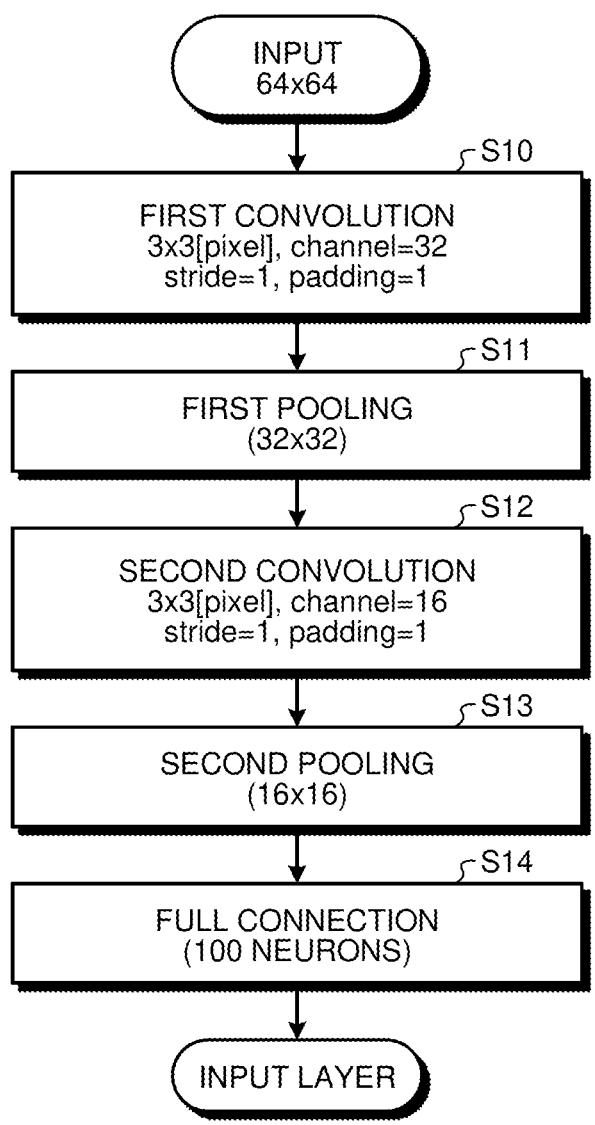
FIG. 5 is a flowchart illustrating a flow of a process of converting multidimensional array information into one-dimensional information.

An example of a process performed by the first data conversion section 77C will now be described by reference to FIG. 5. As illustrated in FIG. 5, a conversion process for conversion of multidimensional array information into one-dimensional information, that is, a method for storage of multidimensional array information has a structure in which inputs and outputs of plural filters have been connected in multiple stages. Specifically, the conversion process for conversion of multidimensional array information into one-dimensional information includes, in order from an input end, a first convolution step S10, a first pooling step S11, a second convolution step S12, a second pooling step S13, and a full connection step S14.

At the first convolution step S10, the first data conversion section 77C has, as an input, multidimensional array information of 64 columns×64 rows and outputs a first feature map of 64×64 by convolution operations. The first feature map depicts what kinds of local features are present at which locations in the input array. In the convolution operations, for example, a 32-channel filter having 3 horizontal pixels×3 vertical pixels is applied at intervals of 1, and the (padding) length by which the periphery is padded with 0 is 1.

At the first pooling step S11, the first data conversion section 77C has, as an input, the first feature map output through the first convolution step S10 and regards, as one new pixel, the largest value in the horizontal 3 pixels× vertical 3 pixels in the first feature map. The first data conversion section 77C executes this operation for the entire map by shifting the pixels. At the first pooling step S11, the first data conversion section 77C thereby outputs a second feature map resulting from the compression of the first feature map.

At the second convolution step S12, the first data conversion section 77C has the second feature map as an input and outputs a third feature map by convolution operations. In this convolution operations, for example, a 16-channel filter having 3 horizontal pixels×3 vertical pixels is applied at intervals of 1, and the (padding) length by which the periphery is padded with 0 is 1.

At the second pooling step S13, the first data conversion section 77C has, as an input, the third feature map output through the second convolution step S12 and regards, as one new pixel, the largest value in the horizontal 3 pixels× vertical 3 pixels in the third feature map. The first data conversion section 77C executes this operation for the entire map by shifting the pixels. At the second pooling step S13, the first data conversion section 77C thereby outputs a fourth feature map resulting from the compression of the third feature map.

At the full connection step S14, the first data conversion section 77C arranges information on the fourth feature map output through the second pooling step S13, into one column. The 100 neurons output through the full connection step S14 then becomes the input layer 101 (see FIG. 4). The convolution technique and the number of output neurons are not limited to those mentioned above. Furthermore, as the convolutional neural network technique, a known model, such as GoogleNet, VGG16, MOBILENET, or EFFICIENTNET, may be used.

Reference will now be made to FIG. 2 again. The model generation section 77D generates a chattering prediction model by machine learning using plural sets of training data (including information converted by the first data conversion section 77C) obtained by the preprocessing section 77B, the chattering prediction model having, as input record data, rolling record data on the cold rolling mill 1 and, as output data corresponding to the input result data, presence and absence of signs of chattering. In this embodiment, a neural network is adopted as the machine learning technique, and the model generation section 77D thus generates a neural network model as the chattering prediction model. That is, the model generation section 77D generates a neural network model as the chattering prediction model that associates between the input record data (rolling record data) and output record data (chattering sign presence and absence data) that are in the training data that have been processed for generation of the chattering prediction model. The neural network model is expressed by, for example, a function formula.

Specifically, the model generation section 77D sets hyperparameters used in the neural network model and trains the neural network model using these hyperparameters. As optimization calculation for the hyperparameters, the model generation section 77D generates, for training data (for example, about a few tens of thousands of sets of rolling record data), a neural network model having some of the hyperparameters changed in a stepwise manner and selects hyperparameters that achieve the highest prediction accuracy for tested data.

The number of hidden layers, the number of neurons in each of the hidden layers, the dropout rate in each of the hidden layers (transmission through neurons is blocked at a certain probability), and an activation function in each of the hidden layers are normally set as the hyperparameters, but the hyperparameters are not limited to these examples. Furthermore, the technique for optimizing the hyperparameters is not particularly limited, and a grid search in which parameters are changed in a stepwise manner, a random search in which parameters are randomly selected, or a search by Bayesian optimization may be used. In addition, the model generation section 77D is incorporated in the arithmetic device 71 as part of the arithmetic device 71 in this configuration but the configuration is not limited to this example. For example, the chattering prediction model may be generated and stored beforehand and read out as appropriate.

Figure 4:
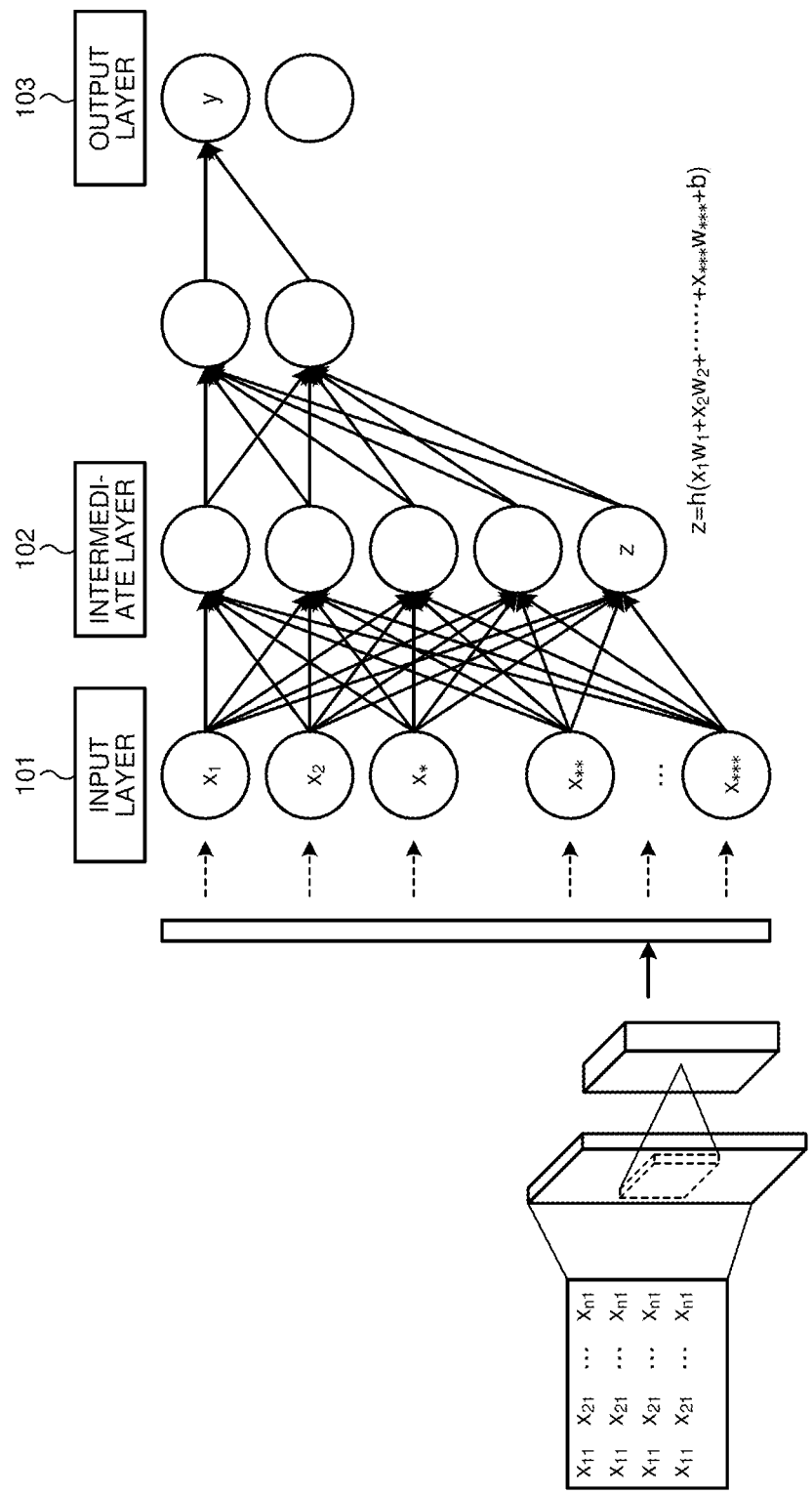
FIG. 4 is a diagram illustrating a flow of a process by a neural network model.

FIG. 4 illustrates a flow of a process by the neural network model in this system. As illustrated in FIG. 14, the neural network model serving as the chattering prediction model in this embodiment includes, in order from an input end, the input layer 101, an intermediate layer 102, and an output layer 103. The training data obtainment section 77A dimensionally compresses input record data using the convolutional neural network in a state where the feature values are kept, and the input record data are stored in the input layer 101 in a state of being one-dimensional information.

The intermediate layer 102 includes plural hidden layers and each of the hidden layers has plural neurons arranged therein. The number of hidden layers included in the intermediate layer 102 is not particularly limited, but empirically, having too many hidden layers reduces the prediction accuracy and the number of hidden layers is thus preferably five layers or less. Furthermore, the number of neurons arranged in each of the hidden layers is preferably a number in a range of one to ten times the explanatory variable input. Neuron transmission from a certain neuron to a subsequent hidden layer is performed via an activation function, along with weighting of variables using weight coefficients. A sigmoid function, a hyperbolic tangent function, or a ramp function may be used as the activation function.

Neuron information transmitted from the intermediate layer 102 is connected in the output layer 103 and a final value on presence or absence of a sign of chattering is output. Training with weight coefficients of the neural network model is performed by gradual optimization of the weight coefficients in the neural network model on the basis of this output result and a past record of chattering in cold rolling of steel sheets S. After the training with the weight coefficients of the neural network model has been performed, the model generation section 77D inputs evaluation data (rolling record data on the steel sheets S to be rolled, the rolling record data being those up to implementation of prediction of chattering using the chattering prediction model) to the neural network model that has been trained with the weight coefficients, to obtain an estimation result for the evaluation data.

Reference will now be made to FIG. 2 again. The result storage section 77E stores training data, evaluation data, parameters (weight coefficients) of the neural network model, output results from the neural network model for the training data, and an output result of the neural network model for the evaluation data.

Information required for implementation of functions of the prediction model generation section 77 includes, for example, information indicating: the temporal change in the vibration waveform of the cold rolling mill 1 measured by the vibration measurement device 16; the temporal change in rolling load information on the cold rolling mill 1 obtained by the load cell 17; the temporal change in tension between rolling stands measured by the tensiometer 18; and the above described explanatory variables and an objective variable for each of required characteristics and properties of the steel sheet S to be rolled (steel type, thickness, and sheet width, for example). The explanatory variables and objective variable are obtained at predetermined time intervals from an initial unsteady rolling stage to a final unsteady rolling stage.

Upon cold rolling of a steel sheet S, the vibration sign monitoring section 78 predicts presence or absence of chattering of the steel sheet S during cold rolling corresponding to rolling conditions for a material to be rolled, by using the chattering prediction model generated by the prediction model generation section 77. The vibration sign monitoring section 78 then determines the amount of control for the rolling speed of the steel sheet S so that the chattering predicted is settled. To perform this process, the vibration sign monitoring section 78 includes an information reading section 78A, a second data conversion section 78B, a vibration sign prediction section 78C, a rolling condition determination section 78D, and a result output section 78E. The vibration sign monitoring section 78 executes functions of the information reading section 78A, the vibration sign prediction section 78C, the rolling condition determination section 78D, and the result output section 78E by executing the vibration sign monitoring program 75 stored in the ROM 73, in response to receipt of a signal notifying the vibration sign monitoring section 78 of the fact that cold rolling is being performed, from the rolling control device 14 (see FIG. 1) via the input device 88.

The information reading section 78A reads rolling conditions for a steel sheet S to be rolled, from the storage device 89, the rolling conditions having been set by an operator at the operation monitoring device 91.

The second data conversion section 78B converts multi-dimensional array information serving as input data to the chattering prediction model, into one-dimensional information data. This process at the second data conversion section 78B is the same as the process at the first data conversion section 77C and detailed description of the process will thus be omitted. The first data conversion section 77C and the second data conversion section 78B may implement a subroutine as a single processing section.

The vibration sign prediction section 78C inputs one-dimensional information generated by the second data conversion section 78B, to the chattering prediction model to find a chattering sign determination value.

In a case where the chattering sign determination value found by the vibration sign prediction section 78C is equal to or larger than a preset threshold, the rolling condition determination section 78D changes the setting of a rolling condition (decreases the rolling speed) until the chattering sign determination value becomes equal to or less than the threshold and performs a process of repeatedly returning to execution of the above described processes by the information reading section 78A, the second data conversion section 78B, and the vibration sign prediction section 78C.

The result output section 78E operates when the chattering sign determination value found by the vibration sign prediction section 78C becomes equal to or less than the preset threshold, and outputs the determined rolling condition (rolling speed).

Examples of information required for implementation of functions of the vibration sign monitoring section 78 include, the chattering prediction model generated by the prediction model generation section 77 and trained with rolling states of steel sheets S and various kinds of information input to the chattering prediction model.

A process by the vibration sign monitoring section 78 will be described next by reference to FIG. 6.

Figure 6:
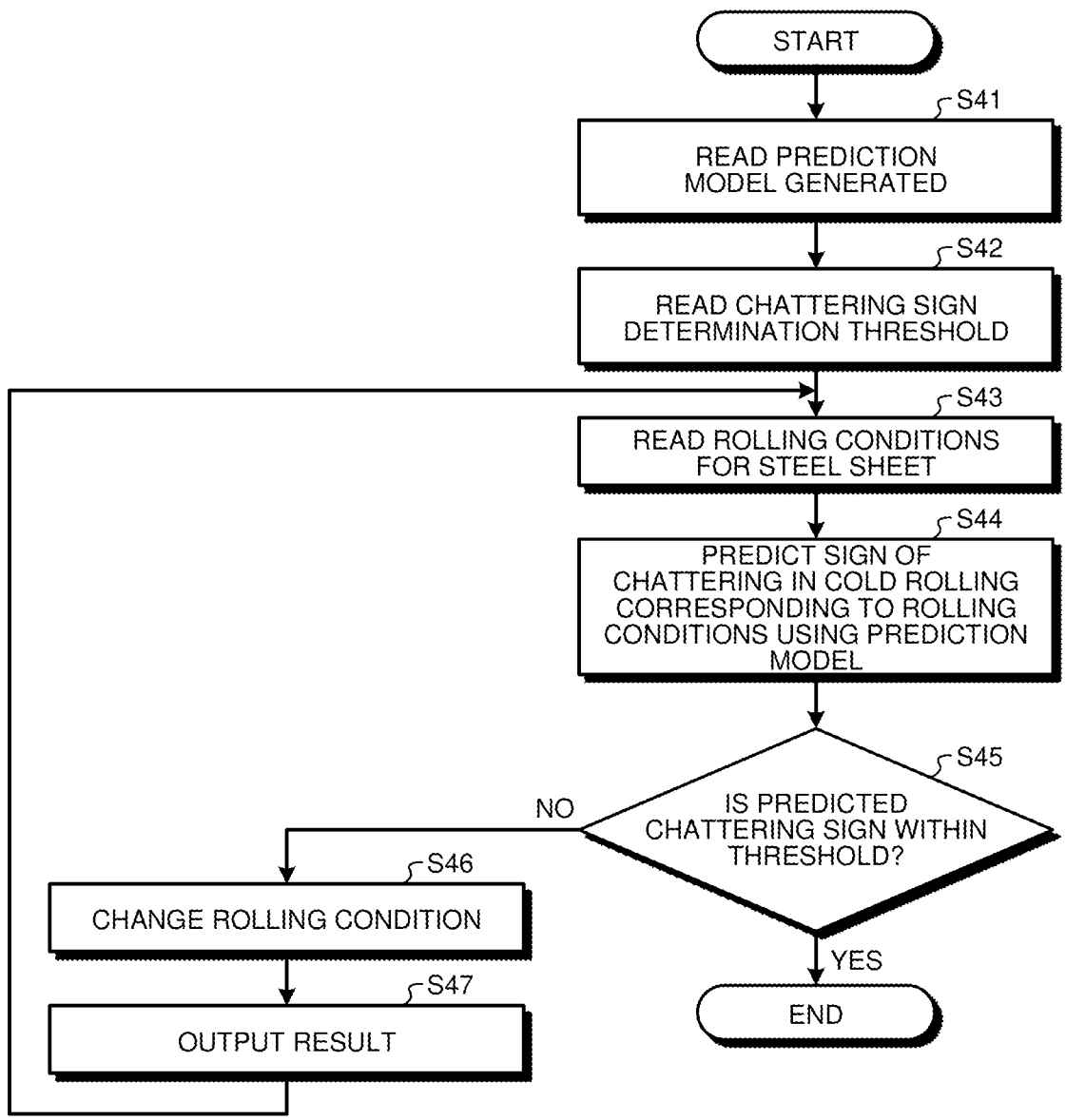
FIG. 6 is a flowchart illustrating a flow of a process by a vibration sign monitoring section.

FIG. 6 is a flowchart illustrating a flow of a process by a vibration sign monitoring section. As illustrated in FIG. 6, in a process at Step S41, the information reading section 78A in the vibration sign monitoring section 78 reads, from the storage device 89, a neural network model serving as a chattering prediction model corresponding to required characteristics and properties of a steel sheet S to be rolled. Subsequently, in a process at Step S42, the information reading section 78A reads, through a higher-level calculator, a required chattering sign determination threshold stored in the storage device 89 via the input device 88.

Subsequently, in a process at Step S43, the information reading section 78A reads, through the higher-level calculator, rolling conditions and temporal waveform information for the steel sheet S to be rolled and stored in the storage device 89 via the input device 88. Subsequently, in a process at Step S44, the vibration sign prediction section 78C of the vibration sign monitoring section 78 finds a chattering sign determination value for the corresponding steel sheet S being cold rolled, by using the neural network model serving as the chattering prediction model and read in the process at Step S41, with input data that are the rolling conditions and temporal waveform information for the steel sheet S to be rolled and read in the process at Step S43, the input data having been formed into a multidimensional array. The prediction result by the neural network model is output to the output layer 103.

Subsequently, in a process at Step S45, the rolling condition determination section 78D in the vibration sign monitoring section 78 determines whether or not the chattering sign determination value found through the process at Step S44 is equal to or less than the chattering sign determination threshold read at Step S42. In a case where convergence of the calculation is not sufficient, an upper limit may be provided for the number of repetitions of the convergence within a calculation time range actually executable in the process at Step S45. In a case where the chattering sign determination value has been determined to be equal to or less than the chattering sign determination threshold (a result of the determination at Step S45 is YES), the vibration sign monitoring section 78 ends the process. On the contrary, in a case where the chattering sign determination value is determined to be not equal to or less than the chattering sign determination threshold (in a case where a result of the determination at Step S45 is No), the vibration sign monitoring section 78 advances the process to a process at Step S46.

In the process at Step S46, the rolling condition determination section 78D changes part of the rolling conditions for the steel sheet S to be rolled, the rolling conditions having been read in the process at Step S43, and proceeds to a process at Step S47. In the process at Step S47, the result output section 78E in the vibration sign monitoring section 78 transmits information related to the determined part of the rolling conditions to the rolling control device 14, via the output device 90. When part of the rolling conditions has been changed through the process at Step S46, the rolling condition determination section 78D determines, in a process at Step S47, the rolling conditions for the steel sheet S to be rolled having the part of the rolling conditions changed through the process at Step S47, specifically, the operation amount for the rolling speed changed, as optimized rolling conditions for the steel sheet S. The rolling condition determination section 78D then determines the operation amount for the rolling speed, on the basis of the rolling conditions at that time. The rolling control device 14 controls the rotation speed of the motor in each of the rolling stands, on the basis of information related to the rolling speed transmitted from the result output section 78E in the cold rolling stage.

In a method of calculating the amount of change in the operation amount for the rolling speed, the rolling condition determination section 78D calculates appropriate rolling conditions for the steel sheet S to be rolled, on the basis of a difference between the chattering sign determination value for the steel sheet S during cold rolling predicted in the process at Step S44 and the required chattering sign threshold read at Step S42. The rolling condition determination section 78D compares the calculated rolling conditions with the rolling conditions for the steel sheet S to be rolled read at Step S43 and changes the rolling conditions in the process at Step S47.

Upon return to the process at Step S43, the vibration sign prediction section 78C reads: the rolling conditions for the steel sheet S to be rolled, the part of the rolling conditions having been changed; and the temporal waveform information obtained after change in the settings. Furthermore, in the process at Step S44, by using the neural network model serving as the chattering prediction model, the vibration sign prediction section 78C finds a chattering sign determination threshold for the steel sheet S being cold rolled, the chattering sign determination threshold corresponding to the rolling conditions for the steel sheet S to be rolled, the part of the rolling conditions having been changed, the rolling conditions having been read in the process at Step S43. In the process at Step S45, the rolling condition determination section 78D then determines whether or not the chattering sign determination value for the steel sheet S being cold rolled is equal to or less than the required chattering sign threshold read at Step S42, the chattering sign determination value having been predicted in the process at Step S44. Until the result of the determination becomes YES, the series of processes at Step S43, Step S44, Step S45, Step S46, and Step S47 is repeatedly executed. The process (chattering control determination step) by the vibration sign monitoring section 78 is thereby ended.

As evident from the above description, in this embodiment, the prediction model generation section 77 generates a chattering prediction model using a machine learning technique in which a past rolling record of steel sheets S is associated with a past chattering record for cold rolling of steel sheets S, the past chattering record corresponding to the rolling record of steel sheets. Subsequently, in this embodiment, the vibration sign monitoring section 78 predicts, during cold rolling of a steel sheet S, presence or absence of chattering of the steel sheet S being subjected to cold rolling corresponding to rolling conditions for the steel sheet S to be rolled, by using the generated chattering prediction model. The vibration sign monitoring section 78 then determines the amount of operation for the rolling speed of the steel sheet S to be rolled so that the predicted chattering sign determination value for the steel sheet S that has been cold rolled becomes equal to or less than the required chattering sign threshold. The chattering during rolling of the steel sheet S is thereby predicted appropriately and the amount of operation for the rolling speed is thereby determined so that that the predicted chattering sign determination value becomes equal to or less than the required chattering sign threshold, and as a result, even in a state where chattering diverges suddenly due to, for example, an external disturbance, the rolling speed is able to be instantly corrected to be in the proper range and thickness change and rupture during the cold rolling are able to be minimized.

Furthermore, in this embodiment, because the chattering prediction model generated by a machine learning technique is a neural network model, chattering during cold rolling of a steel sheet S is able to be predicted more appropriately. In addition, this embodiment enables use of, not only numerical information extracted from operation record data on rolling conditions, but also time series data, as explanatory variables used in the chattering prediction for the steel sheet S in cold rolling, the time series data being, for example, temporal waveform information. Connecting these sets of data and using multidimensional array information as input data enable identification of a factor in the neural network model, the factor largely contributing to chattering in cold rolling.

The steel sheet having the final thickness by cold rolling is subjected to an annealing process for adjustment of mechanical properties and product characteristics. This annealing process is preferably performed in a horizontal furnace, the soaking temperature is preferably 600 to 950° C., and the in-furnace tension is preferably 0.1 to 3.0 kgf/mm$^2$. If the soaking temperature is less than 600° C. or the in-furnace tension is less than 0.1 kgf/mm$^2$, recrystallization does not proceed sufficiently, satisfactory magnetic properties are not obtained, and the shape reforming effect in the annealing is not obtained sufficiently. By contrast, if the soaking temperature exceeds 950° C. or the in-furnace tension exceeds 3.0 kgf/mm$^2$, the crystal grain size is increased, the mechanical strength of the steel sheet is reduced, strain remains in the steel sheet with the application of the tension, and the product characteristics are deteriorated.

Embodiments of the present invention have been described above, but the present invention is not limited to these embodiments and various modifications and improvements may be made. For example, in the above described embodiment, in a case where occurrence of chattering has been predicted, the rolling condition determination section 78D changes the rolling speed, but rolling conditions for the steel sheet S to be rolled may be determined as the optimized rolling conditions for the steel sheet S, the rolling conditions having the mixing ratio changed, the mixing ratio being that between first emulsion rolling oil and second emulsion rolling oil. In this case, the cold rolling mill includes: a first rolling oil supply system that supplies the first emulsion rolling oil to each of the rolling stands; a second rolling oil supply system that supplies second emulsion rolling oil having a concentration different from that of the first emulsion rolling oil, to some of the rolling stands; and flow control valves that each control the mixing ratio between the first emulsion rolling oil supplied from the first rolling oil supply system and the second emulsion rolling oil supplied from the second rolling oil supply system, for supply to each of the rolling stands.

Figure 7:
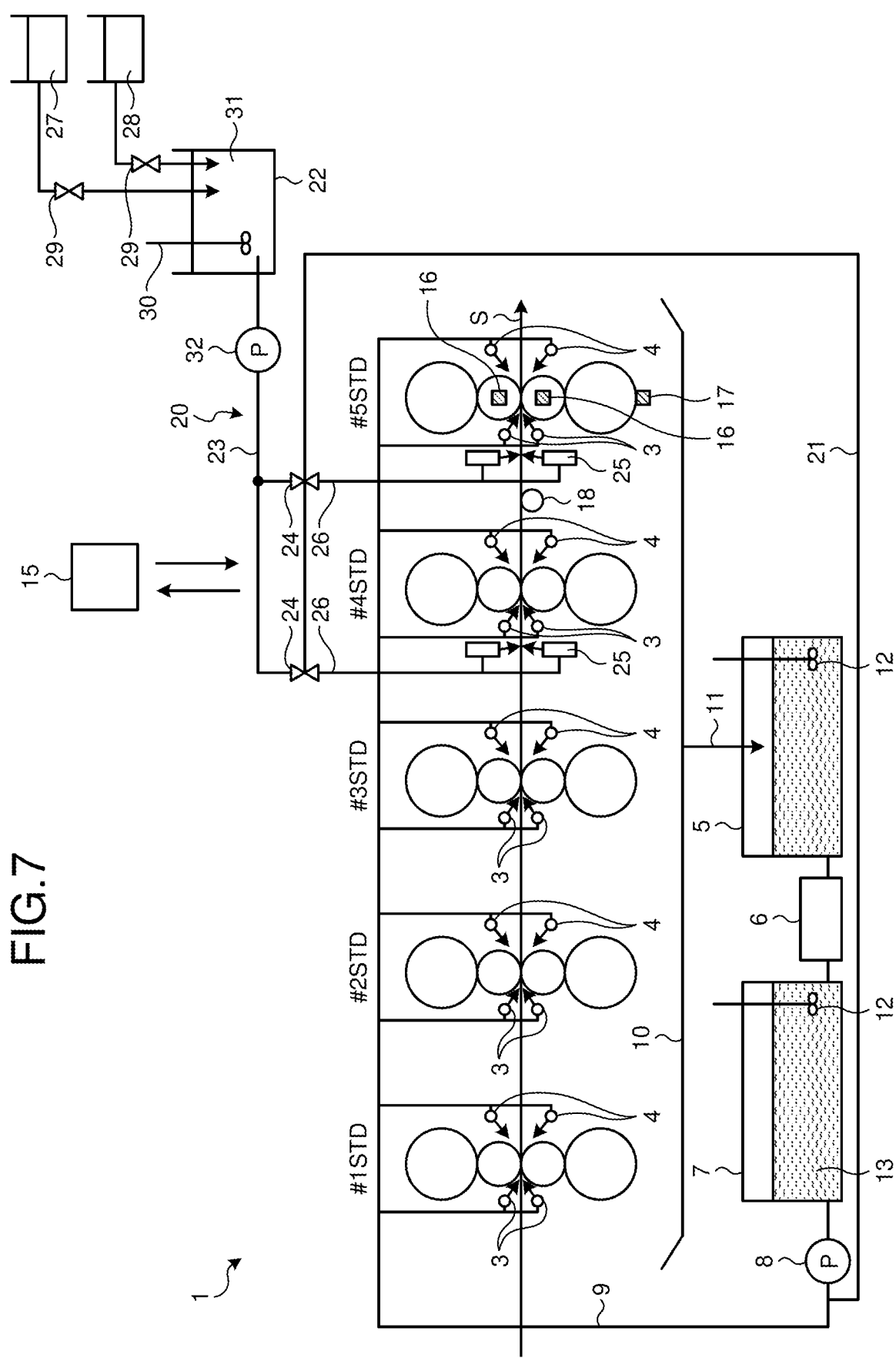
FIG. 7 is a diagram illustrating a configuration of a modified example of the cold rolling mill illustrated in FIG. 1.

Specifically, in this case, as illustrated in FIG. 7, the cold rolling mill 1 includes, in addition to the rolling oil supply system illustrated in FIG. 1 (the first rolling oil supply system), a second rolling oil supply system 20 that supplies second emulsion rolling oil 31 to the fourth rolling stand and fifth rolling stand (#4STD and #5STD).

The second rolling oil supply system 20 includes: a rolling oil duct 21 having one end connected to the supply line 9; a rolling oil duct 23 having one end connected to an emulsion tank 22; flow control valves 24; emulsion headers and mixed rolling oil ducts 26 each having one end connected to the flow control valve 24 and the other end connected to the emulsion header 25.

An undiluted rolling oil tank 27 and a warm water tank 28 have been connected to the emulsion tank 22. Undiluted rolling oil stored in the undiluted rolling oil tank 27 and warm water stored in the warm water tank 28 are supplied into the emulsion tank 22 via pumps (not illustrated in the drawings) and flow control valves 29, and are mixed together by a stirrer 30 in the emulsion tank 22. In the following description, rolling oil in the emulsion tank 22 will be referred to as the second emulsion rolling oil 31.

The temperature conditions for the second emulsion rolling oil 31 are preferably made the same as the temperature conditions for the emulsion rolling oil (hereinafter, referred to as the first emulsion rolling oil). However, in terms of improving the ability of the fourth rolling stand and the fifth rolling stand to cool the steel sheet, the temperature of the second emulsion rolling oil 31 may be made lower, via a cooling device not illustrated in the drawings, than that of the first emulsion rolling oil. Furthermore, the concentration of the rolling oil in the second emulsion rolling oil 31 is not the same as that of the first emulsion rolling oil 13.

The first emulsion rolling oil 13 stored in the clean tank 7 is supplied to the flow control valves 24 through the rolling oil duct 21 by drive of the pump 8. Furthermore, the second emulsion rolling oil 31 is supplied to the flow control valves 24 through the rolling oil duct 23 by a supply pump 32. The second emulsion rolling oil 31 is then mixed with the first emulsion rolling oil 13 in the flow control valves 24 and mixed rolling oil including the second emulsion rolling oil 31 having a predetermined emulsion concentration is thereby formed. This mixed rolling oil is sent to the emulsion headers 25 in the fourth and fifth rolling stands through the mixed rolling oil ducts 26. By being arranged to be branched to both an upper side and a lower side of a steel sheet S, the emulsion headers 25 are configured to be capable of spraying the mixed rolling oil having a desired concentration to both the upper surface and lower surface of the steel sheet S from plural spray nozzles. Subsequently, the rolling oil recovered by the oil pan 10 is returned into the dirty tank 5 through the return piping 11, to be recycled.

The flow control valves 24 may each control the flow rate of the second emulsion rolling oil 31, relatively to the flow rate of the first emulsion rolling oil 13. Furthermore, the second emulsion rolling oil 31 may be directly supplied to the steel sheet S without going through the flow control valves 24 that are part of a mixing unit, but more preferably, a mixture of the first emulsion rolling oil 13 and the second emulsion rolling oil 31 is supplied.

On the basis of the rolling conditions at the time, the rolling condition determination section 78D determines the mixing ratio between the first emulsion rolling oil 13 and the second emulsion rolling oil 31. On the basis of information related to the mixing ratio between the first emulsion rolling oil 13 and second emulsion rolling oil 31, the rolling control device 14 (see FIG. 1) controls the apertures, the information having been transmitted from the result output section 78E in the cold rolling stage, and the flow control valves 24 each control the mixing ratio between the first emulsion rolling oil 13 and second emulsion rolling oil 31 on the basis these apertures. In a method of calculating the amount of change in the mixing ratio between the first emulsion rolling oil 13 and the second emulsion rolling oil 31, the rolling condition determination section 78D calculates, on the basis of a difference between the chattering sign determination value found in the process at Step S44 and the chattering sign threshold read in the process at Step S42, appropriate rolling conditions for the steel sheet S to be rolled. In a case where chattering is predicted to occur, the amount of the second emulsion rolling oil 31 supplied from the second rolling oil supply system is thereby changed.

Furthermore, in this embodiment, the repetition of the chattering prediction for the steel sheet S using the chattering prediction model and the determination of the rolling conditions are performed through the initial unsteady rolling stage to the final unsteady rolling stage, but they may be performed in part of these stages. Furthermore, the cold rolling mill 1 does not necessarily have four stages, may be any multistage rolling mill having two stages (2Hi) or six stages (6Hi), for example, and the number of the rolling stands is also not particularly limited. Furthermore, the cold rolling mill 1 may be a cluster rolling mill or a Sendzimir rolling mill.

Furthermore, in a case where the arithmetic unit 15 calculates an abnormal amount of control exceeding the upper and lower limits for change in the rolling speed or is unable to calculate the amount of control, the rolling control device 14 is unable to execute control based on commands from the arithmetic unit 15. Therefore, in a case where the amount of control from the arithmetic unit 15 is determined to be abnormal or no amount of control is supplied from the arithmetic unit 15, the rolling control device 14 desirably does not implement the embodiment.

In the example of the configuration illustrated in FIG. 2, the output device 90 and the operation monitoring device 91 have not been connected, but they may be connected to enable communication therebetween. Results of processing by the vibration sign monitoring section 78 (in particular, the chattering prediction information from the vibration sign prediction section 78C, the chattering prediction information being for the steel sheet S being rolled, and the rolling conditions that have been determined and changed by the rolling condition determination section 78D) are thereby able to be displayed on an operation screen of the operation monitoring device 91.

First Example

The present invention will hereinafter be described on the basis of an example.

In this example, experiments were conducted by use of the cold rolling mill 1 illustrated in FIG. 1, in these experiments, base steel sheets for magnetic steel sheets were used as rolled materials, the base steel sheets having a base metal thickness of 2.0 mm and a sheet width of 1000 mm and containing Si as listed in Table 1 below, and cold rolling was performed up to a final thickness of 0.300 mm. Undiluted rolling oil used included base oil having an oiliness agent and an antioxidant each added therein at 1 mass % relatively to the base oil and a surfactant added therein at a concentration of 3 mass % relatively to the oil, the base oil including synthesized ester oil having vegetable oil added therein, the surfactant being a nonionic surfactant. Furthermore, emulsion rolling oil to be recycled was prepared as emulsion rolling oil having a concentration of 3.5 mass %, a mean particle size of 5 μm, and a temperature of 55'C. Furthermore, as preliminary training, a neural network model was trained with training data (about 3000 sets of past steel sheet rolling record data), the past steel sheet rolling record data and past chattering record data were associated with each other, and a neural network to be used for prediction of chattering was generated.

In invention examples, information used as the past steel sheet rolling record data included the thicknesses of the base metal for the steel sheets, the thicknesses before and after the cold rolling, the sheet widths, deformation resistance, the rolling loads in the cold rolling, the front and rear tension, the dimensions of the work rolls, the bender amounts of the work rolls, the roughness of the work rolls, the bender amounts of the intermediate rolls, and the amounts of shift of the intermediate rolls. Furthermore, multidimensional array information resulting from connection of the rolling record data in a time direction was used as input record data. Furthermore, a record of thickness change that had occurred with chattering during cold rolling was learnt as the past chattering record data. Furthermore, acceleration was implemented after adjustment of the roll gap in the cold rolling mill, and when the rolling control device 14 was turned on, prediction of chattering of the steel sheet obtained after the cold rolling was performed using the neural network model generated. The rolling speed was then sequentially changed so that the predicted chattering sign determination value became equal to or less than a chattering sign threshold, and the rolling speed for cold rolling was set.

In comparative examples too, similarly to the invention examples, experiments were conducted and in these experiments, base steel sheets (rolling targets) for magnetic steel sheets, having a base metal thickness of 2.0 mm and a sheet width of 1000 mm, and containing Si as listed in Table 1 below were cold rolled to a thickness of 0.3 mm. In the comparative examples, input data formed into a one-dimensional array from the past steel sheet rolling record data without connection of the past steel sheet rolling record data in the time direction were associated with the past chattering record data, and a neural network model to be used for prediction of chattering was thereby generated. Cold rolling was performed with the other conditions being the same as those of the examples.

As listed in Table 1 below, the numbers of occurrences of chattering under the rolling conditions of the invention examples were reduced to 1 or less and application of the present invention was confirmed to be effective. From the above, using the method of cold rolling a steel sheet and the cold rolling mill, according to embodiments of the present invention, appropriately predicting the chattering sign determination value for the rolling of a steel sheet, sequentially changing the rolling conditions so that the predicted chattering sign determination value becomes equal to or less than a preset threshold, and thereby determining the amount of operation for the rolling speed were confirmed to be effective. Furthermore, applying embodiments of the present invention was thereby confirmed to not only prevent chattering and sheet rupture in cold rolling, but also enable stable manufacture of steel sheets having accurate thicknesses and contribute largely to improvement of productivity in subsequent processes and improvement of quality.

TABLE 1

| No. | Amount of Si (mass %) | Final thickness (mm) | Explanatory variable | Dimension of explanatory variable | Data collection pitch (s) | Time pitch of data connected in vertical direction and/or depth direction (s) | Number of occurrences of chattering (number of occurrences in 500 coils) | Remarks |
| --- | --- | --- | --- | --- | --- | --- | --- | --- |
| 1 | 2.5 | 0.30 | Rolling record data | One dimension | 0 | 0 | 7 | Comparative example |
| 2 | 2.5 | 0.30 | Rolling record data | Two dimensions | 0 | 0 | 0 | Invention example |

TABLE 1-continued

| No. | Amount of Si (mass %) | Final thickness (mm) | Explanatory variable | Dimension of explanatory variable | Data collection pitch (s) | Time pitch of data connected in vertical direction and/or depth direction (s) | Number of occurrences of chattering (number of occurrences in 500 coils) | Remarks |
|---|---|---|---|---|---|---|---|---|
| 3 | 2.5 | 0.30 | Rolling record data | Three dimensions | 0 | 0 | 0 | Invention example |
| 4 | 2.5 | 0.20 | Rolling record data | One dimension | 0 | 0 | 14 | Comparative example |
| 5 | 2.5 | 0.20 | Rolling record data | Two dimensions | 0 | 0 | 1 | Invention example |
| 6 | 2.5 | 0.20 | Rolling record data | Three dimensions | 0 | 0 | 0 | Invention example |
| 7 | 2.5 | 0.20 | Rolling record data | One dimension | 0.5 | 0 | 8 | Comparative example |
| 8 | 2.5 | 0.20 | Rolling record data | Two dimensions | 0.5 | 0 | 0 | Invention example |
| 9 | 3.0 | 0.30 | Rolling record data | One dimension | 1.0 | 0 | 10 | Comparative example |
| 10 | 3.0 | 0.30 | Rolling record data | Two dimensions | 1.0 | 0 | 1 | Invention example |
| 11 | 3.0 | 0.30 | Rolling record data | Two dimensions | 2.0 | 0 | 3 | Invention example |
| 12 | 3.0 | 0.30 | Final stand WR vertical vibration velocity time series data | One dimension | 0 | 0 | 8 | Comparative example |
| 13 | 3.0 | 0.30 | Final stand WR vertical vibration velocity time series data | Two dimensions | 0 | 0 | 0 | Invention example |
| 14 | 3.0 | 0.30 | Final stand rolling load time series data | Two dimensions | 0 | 0 | 0 | Invention example |
| 15 | 3.0 | 0.30 | Final stand rear tension time series data | Two dimensions | 0 | 0 | 1 | Invention example |
| 16 | 3.0 | 0.30 | Final stand WR vertical vibration waveform FFT intensity | One dimension | 1.0 | 0 | 6 | Comparative example |
| 17 | 3.0 | 0.30 | Final stand WR vertical vibration waveform FFT intensity | Two dimensions | 1.0 | 0 | 0 | Invention example |
| 18 | 3.0 | 0.30 | Final stand WR horizontal vibration waveform FFT intensity | Two dimensions | 1.0 | 0 | 0 | Invention example |
| 19 | 3.0 | 0.30 | Final stand rolling load waveform FFT intensity | Two dimensions | 1.0 | 0 | 0 | Invention example |
| 20 | 3.0 | 0.30 | Final stand rear tension waveform FFT intensity | Two dimensions | 1.0 | 0 | 1 | Invention example |
| 21 | 3.0 | 0.30 | Final 2 stands WR vertical vibration waveform FFT intensity | One dimension | 1.0 | 0 | 7 | Comparative example |
| 22 | 3.0 | 0.30 | Final 2 stands WR vertical vibration waveform FFT intensity | Two dimensions | 1.0 | 0 | 0 | Invention example |
| 23 | 3.0 | 0.30 | Final 2 stands WR horizontal vibration waveform FFT intensity | Two dimensions | 1.0 | 0 | 0 | Invention example |
| 24 | 3.0 | 0.30 | Final 2 stands WR horizontal vibration waveform FFT intensity | Two dimensions | 0.5 | 0.5 | 0 | Invention example |

Second Example

In this example, conditions that were the same as those for First Example were adopted, except that the mixing ratio between first emulsion rolling oil and second emulsion rolling oil was sequentially changed so that the chattering sign determination value became equal to or less than a predetermined chattering sign threshold, and rolling was performed with the target rolling speed set to 200 mpm, 600 mpm, 800 mpm, and 1000 mpm. As listed in Table 2 below, the numbers of occurrences of chattering under the rolling conditions of invention examples were reduced to 1 or less and application of the embodiments of present invention was confirmed to be effective. Accordingly, it can be understood that using the cold rolling method and cold rolling mill, according to embodiments of the present invention, appropriately predicting the chattering sign determination value for rolling of a steel sheet, sequentially changing the rolling conditions so that the predicted chattering sign determination value becomes equal to or less than a preset chattering sign threshold, and determining the amount of operation for the mixing ratio are preferable. It can thereby be understood that applying embodiments of the present invention not only enables prevention of chattering and sheet rupture in cold rolling, but also: stable obtainment of steel sheets S having accurate thicknesses; and large contribution to improvement of productivity in subsequent processes and improvement of quality. In particular, in Second Example, chattering is able to be minimized without change in the rolling speed and this results in high productivity.

TABLE 2

| No. | Amount of Si (mass %) | Final thickness (mm) | Explanatory variable | Dimension of explanatory variable | Time pitch of data connected in vertical direction and/or depth direction (s) | Number of occurrences of chattering (number of occurrences in 500 coils) | Remarks |
|---|---|---|---|---|---|---|---|
| 1 | 2.5 | 0.30 | Rolling record data | One dimension | 0 | 10 | Comparative example |
| 2 | 2.5 | 0.30 | Rolling record data | Two dimensions | 0 | 0 | Invention example |
| 3 | 2.5 | 0.30 | Rolling record data | Three dimensions | 0 | 0 | Invention example |
| 4 | 2.5 | 0.20 | Rolling record data | One dimension | 0 | 21 | Comparative example |
| 5 | 2.5 | 0.20 | Rolling record data | Two dimensions | 0 | 1 | Invention example |
| 6 | 2.5 | 0.20 | Rolling record data | Three dimensions | 0 | 0 | Invention example |
| 7 | 2.5 | 0.20 | Rolling record data | One dimension | 0 | 12 | Comparative example |
| 8 | 2.5 | 0.20 | Rolling record data | Two dimensions | 0 | 0 | Invention example |
| 9 | 3.0 | 0.30 | Rolling record data | One dimension | 0 | 15 | Comparative example |
| 10 | 3.0 | 0.30 | Rolling record data | Two dimensions | 0 | 1 | Invention example |
| 11 | 3.0 | 0.30 | Rolling record data | Two dimensions | 0 | 3 | Invention example |
| 12 | 3.0 | 0.30 | Final stand WR vertical vibration velocity time series data | One dimension | 0 | 7 | Comparative example |
| 13 | 3.0 | 0.30 | Final stand WR vertical vibration velocity time series data | Two dimensions | 0 | 0 | Invention example |
| 14 | 3.0 | 0.30 | Final stand rolling load time series data | Two dimensions | 0 | 0 | Invention example |
| 15 | 3.0 | 0.30 | Final stand rear tension time series data | Two dimensions | 0 | 1 | Invention example |
| 16 | 3.0 | 0.30 | Final stand WR vertical vibration waveform FFT intensity | One dimension | 0 | 6 | Comparative example |
| 17 | 3.0 | 0.30 | Final stand WR vertical vibration waveform FFT intensity | Two dimensions | 0 | 0 | Invention example |
| 18 | 3.0 | 0.30 | Final stand WR horizontal vibration waveform FFT intensity | Two dimensions | 0 | 0 | Invention example |
| 19 | 3.0 | 0.30 | Final stand rolling load waveform FFT intensity | Two dimensions | 0 | 0 | Invention example |
| 20 | 3.0 | 0.30 | Final stand rear tension waveform FFT intensity | Two dimensions | 0 | 1 | Invention example |
| 21 | 3.0 | 0.30 | Final 2 stands WR vertical vibration waveform FFT intensity | One dimension | 0 | 5 | Comparative example |
| 22 | 3.0 | 0.30 | Final 2 stands WR vertical vibration waveform FFT intensity | Two dimensions | 0 | 0 | Invention example |
| 23 | 3.0 | 0.30 | Final 2 stands WR horizontal vibration waveform FFT intensity | Two dimensions | 0 | 0 | Invention example |
| 24 | 3.0 | 0.30 | Final 2 stands WR horizontal vibration waveform FFT intensity | Two dimensions | 0.5 | 0 | Invention example |

Embodiments, to which the invention made by the inventors has been applied, has been described above, but the present invention is not limited by the description and drawings that are part of the disclosure of the present invention through the embodiments. That is, any other embodiments, examples, and operation techniques, for example, implemented by persons, such as persons skilled in the art, on the basis of the embodiments are all included in the scope of the present invention.

The present invention enables provision of a method of detecting chattering in a cold rolling mill and a chattering detecting device that enable accurate prediction of occurrence of chattering. Furthermore, the present invention enables provision of a cold rolling method, a cold rolling mill, and a method of manufacturing a steel sheet that enable: prevention of chattering; and thus productive cold rolling. In addition, the present invention enables provision of a method of manufacturing a steel sheet, the method enabling manufacture of a steel sheet having desired product characteristics and mechanical properties at a high yield.

REFERENCE SIGNS LIST

1 COLD ROLLING MILL
3 LUBRICATION COOLANT HEADER
4 COOLING COOLANT HEADER
5 DIRTY TANK (RECOVERY TANK)
6 IRON POWDER REMOVAL DEVICE
7 CLEAN TANK (STORAGE TANK)
8 PUMP
9 SUPPLY LINE
10 OIL PAN
11 RETURN PIPING
13 EMULSION ROLLING OIL (FIRST EMULSION ROLLING OIL)
14 ROLLING CONTROL DEVICE
15 ARITHMETIC UNIT
16 VIBRATION MEASUREMENT DEVICE
17 LOAD CELL
18 TENSIOMETER
20 SECOND ROLLING OIL SUPPLY SYSTEM 21, 23 ROLLING OIL DUCT
22 EMULSION TANK
24, 29 FLOW CONTROL VALVE
25 EMULSION HEADER
26 MIXED ROLLING OIL DUCT
27 UNDILUTED ROLLING OIL TANK
28 WARM WATER TANK
30 STIRRER
31 SECOND EMULSION ROLLING OIL
32 SUPPLY PUMP
71 ARITHMETIC DEVICE
74 PREDICTION MODEL GENERATION PROGRAM
75 VIBRATION SIGN MONITORING PROGRAM
76 ARITHMETIC PROCESSING SECTION
77 PREDICTION MODEL GENERATION SECTION
77A TRAINING DATA OBTAINMENT SECTION
77B PREPROCESSING SECTION
77C FIRST DATA CONVERSION SECTION
77D MODEL GENERATION SECTION
77E RESULT STORAGE SECTION
78 VIBRATION SIGN MONITORING SECTION
78A INFORMATION READING SECTION
78B SECOND DATA CONVERSION SECTION
78C VIBRATION SIGN PREDICTION SECTION
78D ROLLING CONDITION DETERMINATION SECTION
78E RESULT OUTPUT SECTION
88 INPUT DEVICE
89 STORAGE DEVICE
90 OUTPUT DEVICE
91 OPERATION MONITORING DEVICE
S STEEL SHEET

The invention claimed is:

1. A method of detecting chattering in a cold rolling mill, the method comprising:
a step of predicting occurrence of chattering during rolling of a material to be rolled, by inputting second multidimensional data to a prediction model,
the second multidimensional data having been generated based on condition data corresponding to array data related to the material to be rolled, and
the prediction model having been trained with an explanatory variable and an objective variable,
the explanatory variable being first multidimensional data generated based on one-dimensional array data representing a past rolling record of rolling of rolled materials by means of a cold rolling mill, and
the objective variable being a past record of occurrence of chattering corresponding to the past rolling record.

2. The method of detecting chattering in the cold rolling mill according to claim 1, wherein
the condition data are one-dimensional array data representing rolling conditions for the material to be rolled, or temporal change of an operation state of the cold rolling mill in rolling of the material to be rolled, and
the first multidimensional data and the second multidimensional data are data resulting from connection of the condition data or the data resulting from shifting of the condition data in a time direction, in a first direction and/or a second direction.

3. The method of detecting chattering in the cold rolling mill according to claim 2, wherein a time pitch in a case where the condition data are shifted in the time direction is equal to or less than one second (but not including 0 seconds).

4. The method of detecting chattering in the cold rolling mill according to claim 1, wherein
the condition data are one-dimensional array data representing signal intensity in FFT, and
the first multidimensional data and the second multidimensional data are data resulting from connection of the condition data or the condition data collected at time intervals, in a first direction and/or a second direction.

5. The method of detecting chattering in the cold rolling mill according to claim 1, including:
a step of decreasing rolling speed of the material to be rolled by the cold rolling mill in a case where chattering has been predicted to occur.

6. The method of detecting chattering in the cold rolling mill according to claim 2, including:
a step of decreasing rolling speed of the material to be rolled by the cold rolling mill in a case where chattering has been predicted to occur.

7. The method of detecting chattering in the cold rolling mill according to claim 3, including:
a step of decreasing rolling speed of the material to be rolled by the cold rolling mill in a case where chattering has been predicted to occur.

8. The method of detecting chattering in the cold rolling mill according to claim 4, including:
a step of decreasing rolling speed of the material to be rolled by the cold rolling mill in a case where chattering has been predicted to occur.

9. The method of detecting chattering in the cold rolling mill according to claim 1, wherein
the cold rolling mill is a cold tandem rolling mill including plural rolling stands and includes a first rolling oil supply system that supplies first emulsion rolling oil to each of the rolling stands and a second rolling oil supply system that supplies second emulsion rolling oil having a concentration different from that of the first emulsion rolling oil to some of the rolling stands, and
the method includes a step of changing amount of supply of the second emulsion rolling oil from the second rolling oil supply system in a case where chattering has been predicted to occur.

10. The method of detecting chattering in the cold rolling mill according to claim 2, wherein
the cold rolling mill is a cold tandem rolling mill including plural rolling stands and includes a first rolling oil supply system that supplies first emulsion rolling oil to each of the rolling stands and a second rolling oil supply system that supplies second emulsion rolling oil having a concentration different from that of the first emulsion rolling oil to some of the rolling stands, and
the method includes a step of changing amount of supply of the second emulsion rolling oil from the second rolling oil supply system in a case where chattering has been predicted to occur.

11. The method of detecting chattering in the cold rolling mill according to claim 3, wherein
the cold rolling mill is a cold tandem rolling mill including plural rolling stands and includes a first rolling oil supply system that supplies first emulsion rolling oil to each of the rolling stands and a second rolling oil supply system that supplies second emulsion rolling oil having a concentration different from that of the first emulsion rolling oil to some of the rolling stands, and the method includes a step of changing amount of supply of the second emulsion rolling oil from the second rolling oil supply system in a case where chattering has been predicted to occur.

12. The method of detecting chattering in the cold rolling mill according to claim 4, wherein the cold rolling mill is a cold tandem rolling mill including plural rolling stands and includes a first rolling oil supply system that supplies first emulsion rolling oil to each of the rolling stands and a second rolling oil supply system that supplies second emulsion rolling oil having a concentration different from that of the first emulsion rolling oil to some of the rolling stands, and the method includes a step of changing amount of supply of the second emulsion rolling oil from the second rolling oil supply system in a case where chattering has been predicted to occur.

13. A cold rolling method, including:

a step of rolling a rolled material by using the method of detecting chattering in the cold rolling mill according to claim 1.

14. A method of manufacturing a steel sheet, the method including:

a cold rolling process of cold rolling a rolled material by using the cold rolling method according to claim 13; and an annealing process of performing annealing for the rolled material that has been cold rolled in the cold rolling process, at a soaking temperature of 600 to 950° C. and in-furnace tension of 0.1 to 3.0 kgf/mm$^2$.

* * * * *